(12) United States Patent
Nandanwar et al.

(10) Patent No.: US 12,451,179 B2
(45) Date of Patent: Oct. 21, 2025

(54) REFRESH WINDOW AWARE TRUNCATION OF RESTORE VOLTAGES FOR RANDOM ACCESS MEMORY

(71) Applicant: QUALCOMM Incorporated, San Diego, CA (US)

(72) Inventors: Darshan Kumar Nandanwar, Bangalore (IN); Arvind Garg, Bangalore (IN); Sanku Mukherjee, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 177 days.

(21) Appl. No.: 18/402,115

(22) Filed: Jan. 2, 2024

(65) Prior Publication Data

US 2025/0218486 A1 Jul. 3, 2025

(51) Int. Cl.
*G11C 11/406* (2006.01)
*G11C 11/4076* (2006.01)
(52) U.S. Cl.
CPC .. *G11C 11/40615* (2013.01); *G11C 11/40603* (2013.01); *G11C 11/4076* (2013.01)

(58) Field of Classification Search
CPC .................................... G11C 11/40615
See application file for complete search history.

(56) References Cited

U.S. PATENT DOCUMENTS

2023/0196998 A1* 6/2023 Han ..................... G09G 3/3208
345/212

* cited by examiner

*Primary Examiner* — Hoai V Ho
(74) *Attorney, Agent, or Firm* — Muncy, Geissler, Olds & Lowe, P.C.

(57) ABSTRACT

Various embodiments include methods that may be performed by a DRAM controller of a computing device for reducing power consumption in restore operations after a memory access. The method may control the memory charge restoration of a memory, by determining a time position within a refresh window of a read operation of at least one memory cell of the memory, charging the at least one memory cell to a first voltage that is based on the time position of the read operation within the refresh window; and re-charging the at least one memory cell to a full voltage upon termination of the refresh window, such that the first voltage is less than the full voltage in a first portion of the refresh window.

20 Claims, 12 Drawing Sheets

Table 1

| Sub-window | Distance to next refresh [X,y)- Lower bound y, Upper bound X | | | Target restore voltage (Vdd) | tRAS tWR tRCD (DRAM cycles) |
|---|---|---|---|---|---|
| | 64ms-row | 128ms-row | 256 ms-row | | |
| 1st | [64ms, 48ms) | [128ms, 96ms) | [256ms, 192ms) | 0.975 | 42 25 15 |
| 2nd | [48ms, 32ms) | [96ms, 64ms) | [192ms, 128ms) | 0.92 | 27 18 15 |
| 3rd | [32ms, 16ms) | [64ms, 32ms) | [128ms, 64ms) | 0.86 | 21 14 15 |
| 4th | [16ms, 0ms) | [32ms, 0ms) | [64ms, 0ms) | 0.8 | 18 11 15 |
| No trimming | | | | 0.975 | 42 25 15 |

Table 2

| Upgrade | Distance to Next refresh | Target restore voltage (Vdd) | tRAS tWR tRCD (DRAM cycles) |
|---|---|---|---|
| 256ms->128ms | [128ms, 64ms) | 0.86 | 21 14 15 |
| | [64ms, 0ms) | 0.8 | 18 11 15 |
| 256ms->64ms | [64ms, 0ms) | 0.8 | 18 11 15 |
| 128ms->64ms | [64ms, 32ms) | 0.86 | 21 14 15 |
| | [32ms, 0ms) | 0.8 | 18 11 15 |

Table 3

| Profiled refresh rate | Rate flag | Rate Flag after Rate Upgrade |
|---|---|---|
| 64ms | 0 | n/a |
| 128ms | 01A | 128 → 64ms: 010 |
| 256ms | 1BC | 256 → 128ms: 1BC ⊕ 0B0<br>256 → 64ms: 100 |

FIG. 10

Table 4

| # of refresh intervals(A) | # of subwindows (B) | Storage Overhead(bits) | | | Total Bytes (A * B * (C + D + E)) |
|---|---|---|---|---|---|
| | | tRAS (bits) (C) | tWR(bits) (D) | tRCD(bits) (E) | |
| 3 | 4 | 8 | 8 | 8 | 36 |

Table 5

| # of refresh intervals(A) | # of subwindows (B) | Storage Overhead(bits) | | | Total Bytes (A * B * (C + D + E)) |
|---|---|---|---|---|---|
| | | tRAS (bits) (C) | tWR(bits) (D) | tRCD(bits) (E) | |
| 3 | 2 | 8 | 8 | 8 | 18 |

Table 6

| # of bins | counter(bits) per bin | Bytes |
|---|---|---|
| 8192 | 1 | 1024 |

Table 7

| # of bins | counter(bits) per bin | Bytes |
|---|---|---|
| 8192 | 3 | 3072 |

FIG. 11

REFRESH WINDOW AWARE TRUNCATION OF RESTORE VOLTAGES FOR RANDOM ACCESS MEMORY

BACKGROUND

Developers and users of computing devices are always seeking improved operation performance and endurance. As memory banks of dynamic random access memory (DRAM) devices increase in size, their power consumption increases, which can be a problem for battery powered devices and requires thicker power traces to carry the additional current. To retain memory that has been stored in RAM requires periodic refreshes of the full voltage level in each memory cell. Writes and reads of data to rows of memory cells require refreshes of the full voltage level of each memory cell. Thus, in the case of back to back read commands followed by a refresh window end, three full voltage levels would need to be recharged. This wastes energy because the full refresh may not be necessary in order to reach the end of the refresh window with full readability of the memory cell (e.g., voltage above a minimum readable voltage).

SUMMARY

Various aspects may include methods performed by memory control circuitry for control of memory charge restoration of a memory, which may include determining a time position within a refresh window of a read operation of at least one memory cell of the memory and charging the at least one memory cell to a first voltage that is based on the time position of the read operation within the refresh window, in which the first voltage is less than the full voltage in a first portion of the refresh window. The at least one memory cell may be re-charged to a full voltage upon termination of the refresh window. The first voltage may be sufficient for the at least one memory cell to remain readable at an end of the refresh window.

In some aspects, determining the time position of the read operation within the refresh window may include determining that the read operation is received within one of at least three portions of the refresh window. Further, the first voltage to which the at least one memory cell is charged when a read operation occurs in a first portion of the refresh window may be greater than a second voltage to which the at least one memory cell is charged when a read operation occurs in a second portion of the refresh window that is later than the first portion. Some aspects may further include receiving the read operation in the first portion of the refresh window results in a refresh to the first voltage, and receiving the read operation in a second portion of the refresh window before the first portion results in a refresh to a second voltage higher than the first voltage.

In some aspects, the method may further include determining whether a change of a refresh rate of the at least one memory cell reduces voltage requirements for read operations based on a frequency of memory read operations and changing the refresh rate in response to determining that increasing the refresh rate reduces voltage requirements for read operations. In some aspects, the voltage requirements for read operations at different refresh rates may be provided as decay timing parameters, and charging the at least one memory cell to the first voltage based on the time position of the read operation within the refresh window may include comparing the time position to the decay timing parameters.

Further aspects include DRAM memory including a DRAM controller configured to perform operations of any of the methods summarized above. Further aspects include one or more processors and memory cells including means for performing functions of any of the methods summarized above. Further aspects include DRAM memory with multi-rate capabilities and means for switching between refresh rates.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

FIG. 10 is a series of tables illustrating example parameters for selecting voltage levels in accordance with various embodiments.

FIG. 11 is a series of tables illustrating overhead for various monitoring and calculations in accordance with various embodiments.

DETAILED DESCRIPTION

Figure 1:
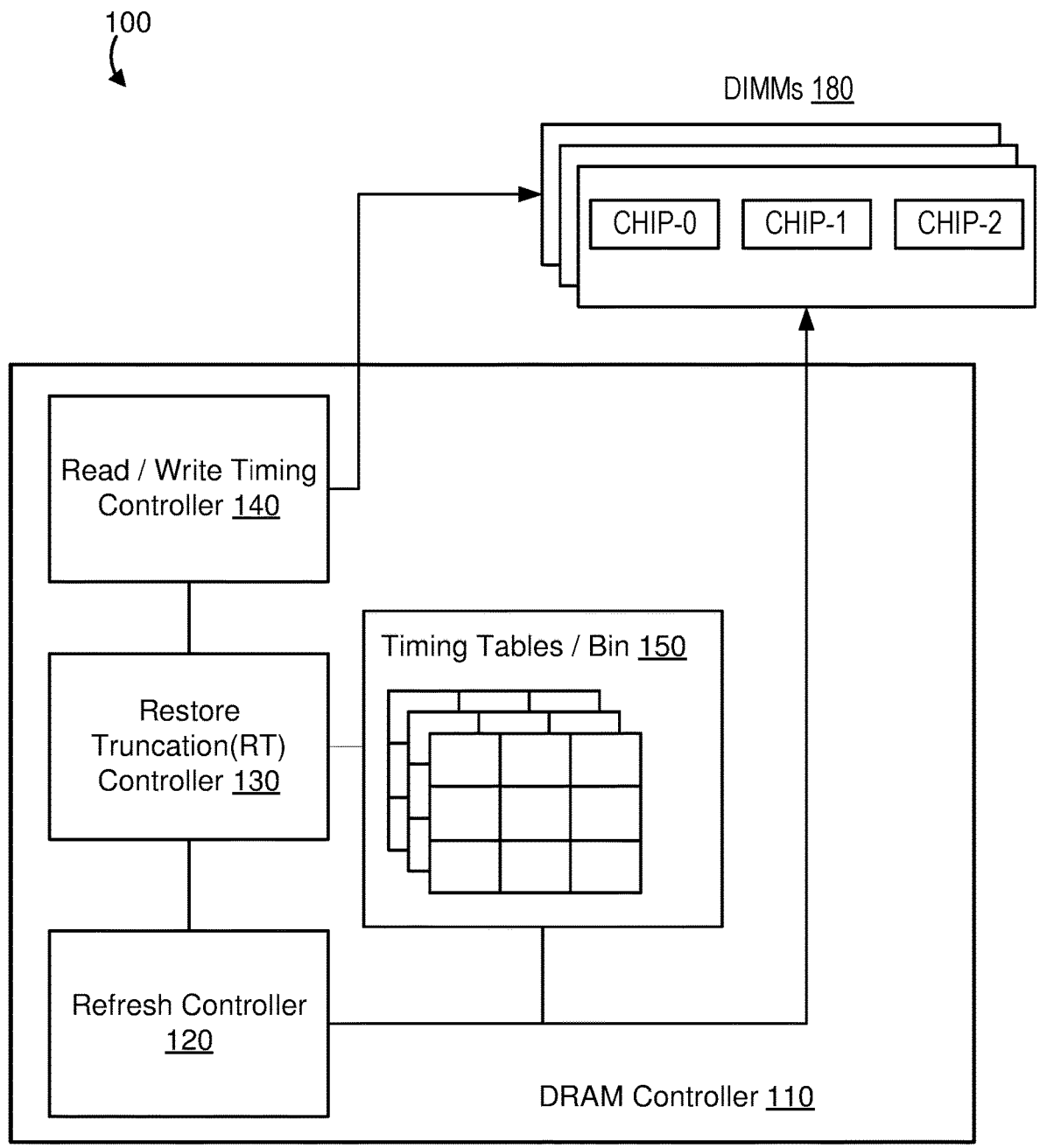
FIG. 1 is a system block diagram illustrating an example memory system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and computing devices for implementing methods for reducing voltage levels at particular periods in the refresh cycle of a memory to improve power efficiency. Various embodiments may include methods executed by a dynamic random access memory (DRAM) controller to change a refresh voltage level for one or more rows of memory based on an upcoming automatic or periodic refresh window end. Various embodiments may include methods executed by a DRAM controller update or change a refresh rate (or refresh window size) for one or more rows of memory based on a determination that power would be saved by a refresh rate change.

In general, in order to continue to store values in DRAM memory, the cells that make up the rows of memory must be refreshed with new energy because the energy representing a binary value in cell memory dissipates or decays over time. The decay rate of memory cells in memory is a parameter of the memory design and may be recorded or stored as a parameter in hardware of the memory. In addition, in order for memory to be read, a given minimum voltage must be present for the memory controller to read or detect. This minimum voltage also may define the limits for refresh voltage levels of the memory cell.

When a memory cell or row is read by the memory controller, the memory controller then refills the row to maintain the values that have been read in the memory. Refill (called a "restore") is necessary because each read or write is destructive and drains the memory cell of its energy as part of the detection of the binary value stored therein. Conventionally, the refill of the memory row or cell after a memory access is a full refill to the voltage max used for whichever refresh rate is used by the memory controller. For example, a faster refresh rate may not require a refill to as high of a voltage level because the decay (i.e., decay time) will be less before the next refresh.

When a row of memory cells is refreshed to a full voltage and then read later in the refresh window by the memory controller, the row of memory cells would then, in conventional DRAM, be restored to a full voltage again, where the full voltage may depend on the refresh rate. This restore may occur directly before the end of a refresh window, which in practice would mean that the memory row is refilled after the read (via a restore) and then drained and refilled shortly thereafter at the end of the refresh window (via a refresh). This practice wastes energy and contributes to overall energy inefficiency and higher power throughput requirements.

As DRAM is scaled into smaller and smaller cells, capacitor(s) used in bit-cells become smaller and hold less charge. Similarly, the access transistor decreases in size with weaker drivability. Cell behavior changes statistically instead of deterministically. As a result, memory cells may require longer for a restoration time. DRAM manufacturers typically set worst-case timing parameters in order to take this variability into account. This statistical variability impacts DRAM performance considerably.

Since cells may leak charge monotonically, it may be unnecessary to fully charge a row after read or write. Instead, the cell information may be retained even if the restore operation is terminated or truncated early once the cells in this row have more charge than what would have remained under natural decay within the refresh window. Commands may be sent from the memory controller to the DRAM module following predefined timing constraints defined in the Joint Electron Device Engineering Counsel (JEDEC) standard or the DDRx standard. The timing constraints may include (1) a time between (delay) a row activation start (RAS) and a column activation start (CAS) in a given access of a memory table (abbreviated as tRCD), (2) a time between the disabling of one memory access line and the enabling of access on another memory line (abbreviated as tRAS), and (3) a write recovery time (abbreviated as tWR).

DRAM may support three types of accesses—read, write, and refresh. A memory controller may decompose each access into a series of commands sent to DRAM modules, such as ACT (Activate), RD (Read), WR (Write) and PRE (Precharge). A DRAM module may respond passively to commands. For example, an ACT command may destructively latch the specified row into the row buffer through charge sharing, and then may restore the charge in each bit cell of the row. Or for example, a WR command overwrites data in the row buffer and then updates (restores) values held in a row's cells. Restore operations may be used as part of either read or write requests. For read commands, a restore may refill a charge destroyed by accessing a row. For write commands, a restore may update a row with new data values.

Further, DRAM needs to be refreshed periodically to prevent data loss as described above. According to the JEDEC standard, an 8K all-bank auto-refresh (REF) command may be sent to all DRAM devices in a rank within one retention time interval (Tret). The retention time interval may be called as a refresh window (tREFW) which is typically 64 ms for DDRx. The gap between two REF commands may be called a refresh interval (tREFI), whose typical value is 7.8 μs, (i.e., 64 ms/8K). If a DRAM device has more than 8K rows, rows are grouped into 8K refresh bins. One REF command is used to refresh multiple rows in a bin. An internal counter in each DRAM device tracks the designated rows to be refreshed upon receiving REF. The refresh operation takes a particular time period to complete (called tRFC), which proportionally depends on the number of rows in the bin. The refresh rate of one bin may be determined by the leakiest cell in the bin. These timing parameters provide constraints that may be managed as described further below (e.g., FIGS. 10-11).

Some embodiments may reduce voltage or power waste by monitoring a position on a decay curve or within a refresh window in order to determine a lower voltage refill level that can still keep the memory row/cell readable until the next refresh. In other words, the DRAM controller may include a monitoring capability to evaluate a position in a refresh window and may include a restore component that can perform a voltage refill/restore operation to a given voltage that is less than a full or max voltage for the refresh rate.

Some embodiments may include a memory controller and memory cells/rows/banks that are configured to enable multi-rate refreshing such that different refresh rates may be set via command from the memory controller to the memory row or memory bank. Further energy savings may be determined and realized by changing a refresh rate together with a read command so as to change the decay curve and change the next automatic refresh to reduce the voltage refill needed after a read or other memory access.

A memory (DRAM) controller may be a system-on-a-chip or a system-in-a-package, or other integrated circuit including hardware, firmware, software, or a combination thereof. The term "system-on-a-chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SoCs may also include software for controlling the integrated resources and processors, as well as for controlling peripheral devices. The host controller may form a portion of the SoC and a Universal Flash Storage (UFS) device may form a portion of the SoC.

The term "system-in-a-package" (SIP) may be used herein to refer to a single module or package that contains multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high-speed communication circuitry and packaged in close proximity, such as on a single motherboard or in a single computing device. The proximity of the SoCs facilitates high speed communications and the sharing of memory and resources.

The term "processing system" may be used herein to refer to one more processors, including multi-core processors, that are organized and configured to perform various computing functions. Various embodiment methods may be implemented in one or more of multiple processors within a UFS memory device or host memory controller as described herein.

FIG. 1 is a system block diagram illustrating an example system suitable for implementing any of the various embodiments. The system 100 may include one or more computing devices or processors connected to one or more memory banks on one or more Dual In-line Memory Modules (DIMMs) 180 of DRAM. For example, the system 100 may include an SoC 202 including DRAM controller 110 connected to the DIMMs 180. The DIMMs 180 may be formed of one or more memory chips (CHIP-0, CHIP-1, CHIP-2) which may be connected on a memory stick connected to a memory bus (e.g., interconnect bus 226). The DRAM controller 110 may connect to each of the chips or DIMMs 108 so as to control one or more memory rows, bins or banks thereon. The DRAM controller 110 may be configured to supply and control voltage to the memory rows on DIMMs 108 including as part of a memory refresh.

The DRAM controller 110 may include one or more sub-controllers or modules which may be hardware (e.g., IC) or software, or a combination thereof. The read/write timing controller 140 may connect to a system clock (e.g., clock 206) and may manage sequencing or ordering of read and write accesses to DIMMs 108 that are received at the DRAM controller 110 from outside processors and applications (e.g., digital signal processor 210). The read/write timing controller 140 may process memory accesses based on a clock and may manage the timing of other memory management functions such as refresh rates/timings, voltage refill after a read, and other command executions (e.g., REF, ACT).

The restore truncation (RT) controller 130 may connect to timing tables 150 for memory bins and may manage a restore voltage level to be provided to a given memory row/bin as part of a restore operation. The restore voltage level may be based on the assigned refresh rate of the memory row or bin and may be determined based on a timing within a refresh window as monitored by the read/write timing controller 140 and/or a refresh controller 120. The RT controller may receive a current timing of a memory access relative to a refresh window from the timing tables 150 for each memory bin. As described below, the restore voltage determined and/or supplied by the RT controller 130 may be based on an approximation of a decay curve of the memory row or bin and may be based on one or more segments or sub-windows of the refresh window, which are monitored and stored by the DRAM controller 110.

The refresh controller 120 may manage one or more timing tables including timing tables 150 for each memory bin and may set a refresh rate for one or more memory bins/rows. As noted above, a refresh may be performed periodically based on the leakage rate of the memory row/bin, the refresh rate, a timing for the refresh in a sequence with other refreshes, and other parameters. The refresh controller 120 may monitor these parameters and manage the sequence of refreshes across the bins of the DIMMs 108. One of the timing tables 150 may be periodically updated or asynchronously updated (e.g., upon a memory access) by the refresh controller 120 to provide timing reference points for the DRAM controller 110 and its sub-components.

Figure 2:
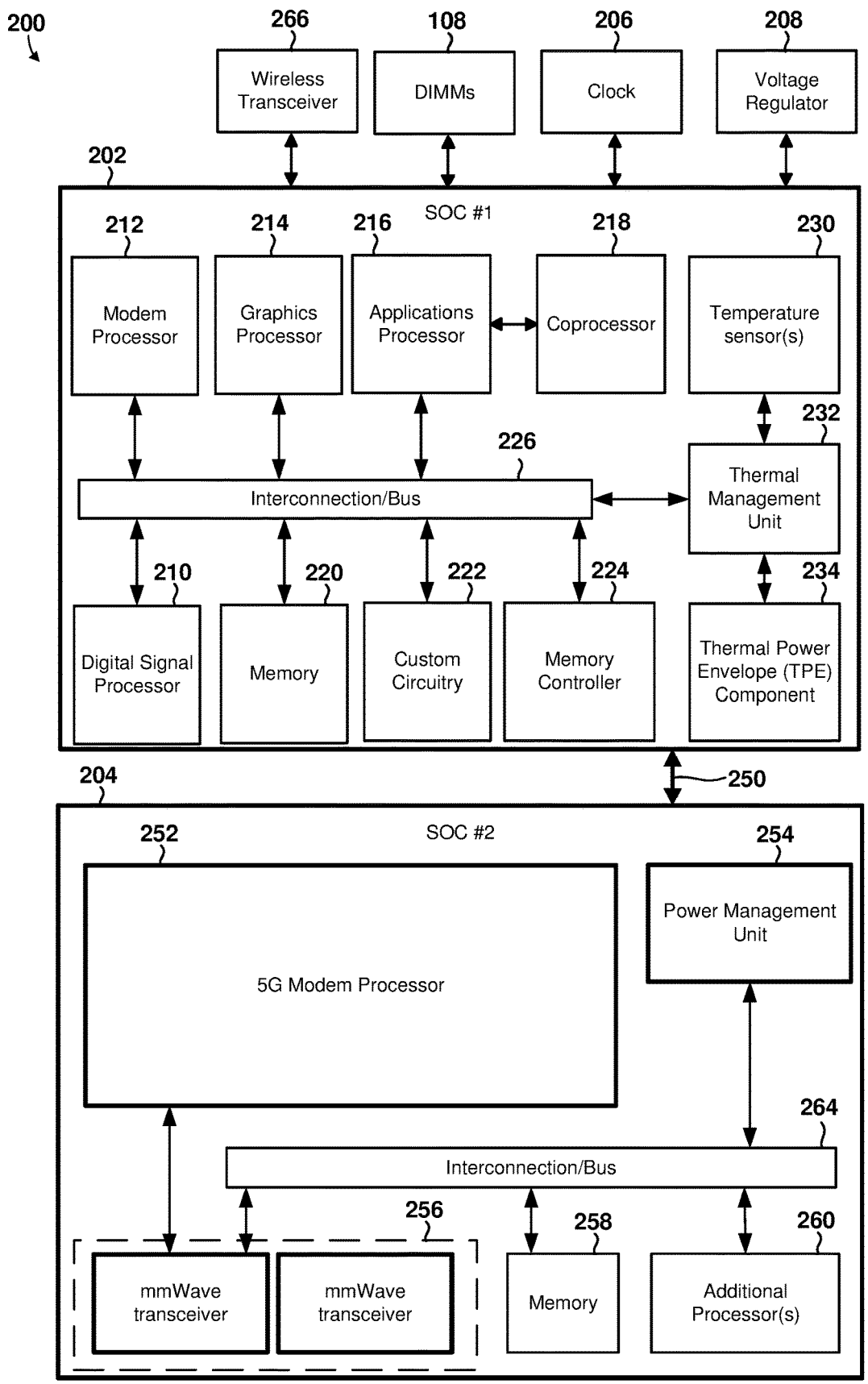
FIG. 2 is a system block diagram illustrating an example computing system suitable for implementing any of the various embodiments.

FIG. 2 is a component block diagram illustrating an example computing device 200 suitable for implementing any of the various embodiments. Various embodiments may be implemented on a number of single-processor and multi-processor computer systems, including a system-on-chip (SoC) or system in a package (SIP). The computing device may form a processor system.

With reference to FIGS. 1-2, the illustrated example computing device 200 (which may be a system-in-a-package in some embodiments) includes a two SoCs 202, 204 (e.g., SoC 202) coupled to a clock 206, a voltage regulator 208, a wireless transceiver 266 configured to send and receive wireless communications via an antenna (not shown) to/from wireless computing devices, such as a base station, wireless device, and/or computing device (e.g., system 100). In some embodiments, the first SoC 202 may operate as central processing unit (CPU) of the computing device 200 that carries out the instructions of software application programs by performing the arithmetic, logical, control and input/output (I/O) operations specified by the instructions. In some embodiments, the second SoC 204 may operate as a specialized processing unit. For example, the second SoC 204 may operate as a specialized 5G processing unit responsible for managing high volume, high speed (e.g., 5 Gbps, etc.), and/or very high frequency short wavelength (e.g., 28 GHz mmWave spectrum, etc.) communications.

The first SoC 202 may include a digital signal processor (DSP) 310, a modem processor 212, a graphics processor 314, an application processor (AP) 216, one or more coprocessors 218 (e.g., vector co-processor) connected to one or more of the processors, memory 220 (e.g., cache), custom circuitry 222, memory controller 224 (e.g., DRAM controller 110), an interconnection/bus module 226, one or more sensors 230 (e.g., accelerometer, temperature sensor, pressure sensor, optical sensor, infrared sensor, analog sound sensor, etc.), a thermal management unit 232, and a thermal power envelope (TPE) component 234. The second SoC 204 may include a low power processor 252, a power management unit 254, an interconnection/bus module 264, a BT controller 256, memory 258, and various additional processors 260, such as an applications processor, packet processor, etc.

Each processor 210, 212, 214, 216, 218, 224, 252, 260 may include one or more cores, and each processor/core may perform operations independent of the other processors/cores. For example, the first SoC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors

210, 212, 214, 216, 218, 224, 252, 260 may be included as part of a processor cluster architecture (e.g., a synchronous processor cluster architecture, an asynchronous or heterogeneous processor cluster architecture, etc.).

The first and second SoC 202, 204 may include various system components, resources, and custom circuitry for managing sensor data, analog-to-digital conversions, wireless data transmissions, and for performing other specialized operations, such as decoding data packets and processing encoded audio and video signals for rendering in a web browser or audio/video application. For example, the memory controller 224 of the first SoC 202 may include power amplifiers, voltage regulators, oscillators, phase-locked loops, peripheral bridges, data controllers, timers, and other similar components. The custom circuitry 222 may include circuitry to interface with peripheral devices, such as cameras, electronic displays, wireless communication devices, external memory chips, etc.

The first and second SoC 202, 204 may communicate via interconnection/bus module 250. In some embodiments, the interconnection/bus module may be a connection established by transceiving (i.e., receiving and transmitting) components within both the SoC 202 and SoC 204. For example, the low power processor 252 may include a universal asynchronous receiver-transmitter (UART) and the application processor 216 may include a multiple signal messages (MSM) UART driver that is communicatively connected to the UART of the low power processor 252.

The various processors 210, 212, 214, 216, and 218, may be interconnected to one or more memory elements 220, memory controller 224, and custom circuitry 222, and a thermal management unit 232 via an interconnection/bus module 226. Similarly, the low power processor 252 may be interconnected to the power management unit 254, the BT controller 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

In various embodiments, any or all of the processors 210, 212, 214, 216, and 218 in the system may operate as the SoC's main processor, central processing unit (CPU), microprocessor unit (MPU), arithmetic logic unit (ALU), etc. One or more of the coprocessors 218 may operate as the CPU. In addition to the example SIP 100 discussed above, various embodiments may be implemented in a wide variety of computing systems, including a single processor, multiple processors, multicore processors, or any combination thereof.

The first and/or second SoCs 202, 204 may further include an input/output module (not illustrated) for communicating with resources external to the SoC, such as a clock 206, the DIMMs 108, a voltage regulator 208, and one or more wireless transceivers 266. Resources external to the SoC (e.g., clock 206, voltage regulator 208) may be shared by two or more of the internal SoC processors/cores (e.g., collectively processor system). Further, the memory controller 224 may connect to external memory including DIMMs 108 and control memory accesses and ports to the DIMMs 108 as described further below.

In addition to the example computing device 200 discussed above, various embodiments may be implemented in a wide variety of computing systems, which may include a single processor, multiple processors, multicore processors, or any combination thereof. In some embodiments, the various processors of the SoC 202 and SoC 204 may be located within a same SoC. For example, the application processor 216 and processor 252 may be located within a same SoC, such as in a single SoC of a wearable device, which may access external memory (e.g., DIMMs 108) via the memory controller 224 and interconnection bus 226.

Figure 3:
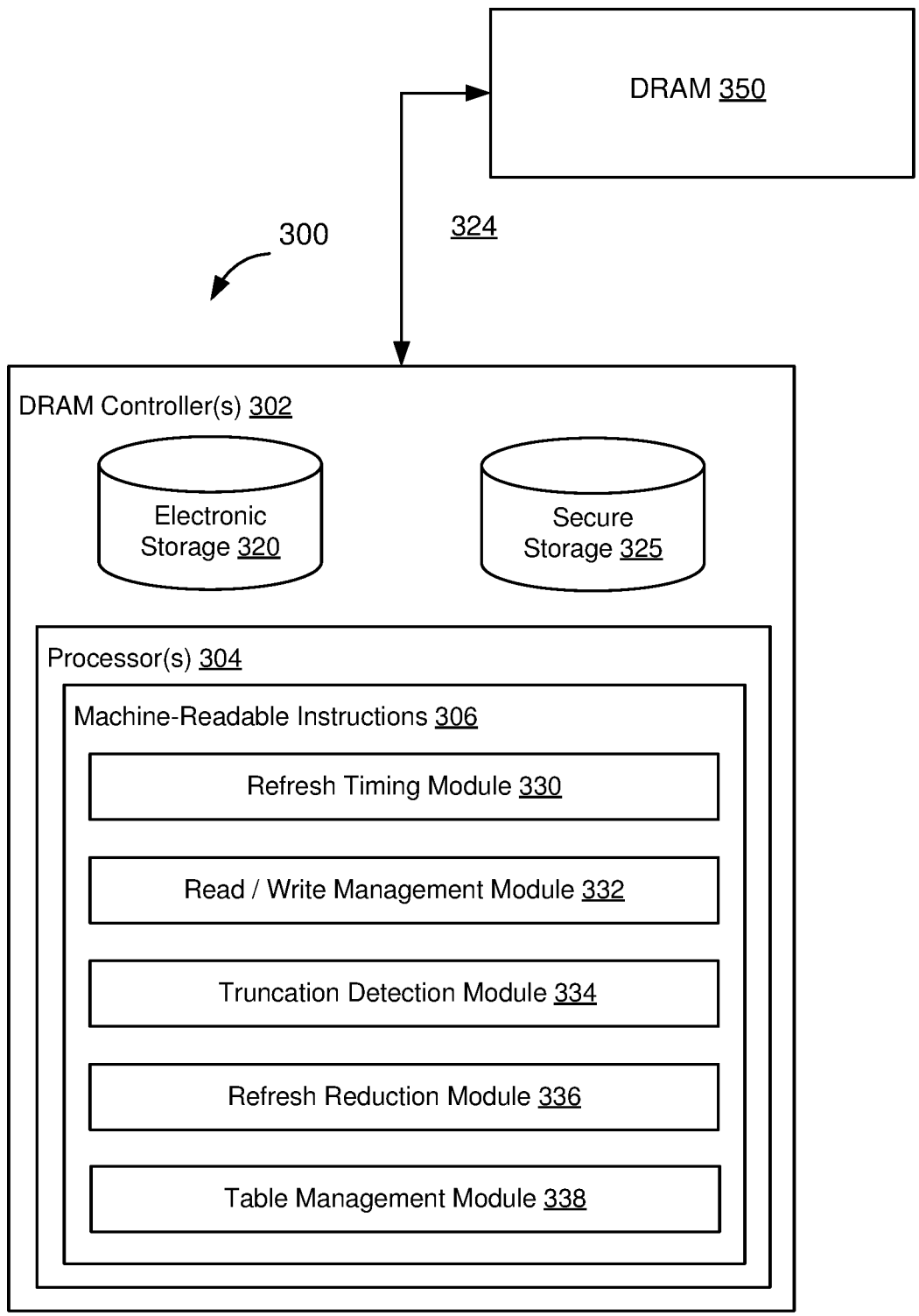
FIG. 3 is a component block diagram illustrating an example computing device suitable for implementing any of the various embodiments.

FIG. 3 is a component block diagram illustrating an example system 300 configured for reducing power usage by DRAM memory according to some embodiments. With reference to FIGS. 1-3, the system 300 may include a DRAM controller 302 and DRAM 350, which may communicate via a communication link 324. DRAM controller 302 may be a processing system of a computing device that may transmit read and write requests to DRAM 350 and manage voltage to the memory cells of DRAM 350. The system 300 may include a plurality of hardware, software, and/or firmware components operating together to provide the functionality attributed herein to the processor(s) 304. The instructions modules and computer modules described herein may be implemented in hardware, software executing in one or more processors, firmware executing in one or more processors, or a combination hardware and one or more processors executing software or firmware. For example, one module may be embodied as memory array hardware and another module may be embodied as an integrated circuit executing firmware.

The DRAM controller 302 may include electronic storage 320 that may be configured to store information as instructed by the processors 304 via machine-readable instructions 306. The electronic storage 320 may include cache memory or designated DRAM bins that electronically store information such as tables 1-3 of FIG. 10 and timing tables 150. The DRAM controller 302 may include secure storage 325 that may act as a buffer or cache for processing and queueing memory commands, which may be managed by the read/write timing controller 140. Th secure storage 325 may be secured at start up.

The processor(s) 304 may be configured by machine-readable instructions 306. Machine-readable instructions 306 may include one or more instruction modules. The instruction modules may include computer program modules. The instruction modules may include one or more of refresh timing module 330, a read/write management module 332, a truncation detection module 334, a refresh reduction module 336, a table management module 338, and other instruction modules (not illustrated). The DRAM controller 302 may include one or more processor(s) 304 of a processing system configured to implement the machine-readable instructions 306 and corresponding modules.

In some embodiments, the processor(s) 304 executing refresh timing module 330 may be configured to manage timing of memory refreshes across multiple bins of multiple DIMMs. For example, the refresh timing module 330 may assign a refresh time and a refresh window to each memory bin of the DRAM 350 and may signal the DRAM controller 302 or the refresh controller 120 to supply voltage to a particular voltage line to refresh the appropriate memory bin. The refresh may be performed periodically and automatically and may be triggered by changing the refresh rate such that a change in refresh rate from 64 ms to 128 ms may trigger a refresh to a higher voltage level to maintain the memory for the longer period. As another example, a change in the refresh rate from 128 ms to 64 ms may not trigger a refresh depending on the timing of the change and may just change a timing of the next refresh or the end of the refresh window.

In some embodiments, the processor(s) 304 executing the read/write management module 332 may be configured to cache and organize one or more memory access commands. The read/write management module 332 may operate as part of or may be executed by the read/write timing controller 140 and/or the DRAM controller 302/110. The read/write management module 332 may receive memory access commands from various programs or processors on a computing device and may translate those commands into one or more commands (e.g., ACT, RD, REF) to be performed in sequence within a given timing.

In some embodiments, the processor(s) 304 executing the truncation detection module 334 may monitor upcoming memory access commands in the read/write management module 332 and may detect one or more commands that would be a candidate for energy saving by truncating a restore such that less energy is restored after the command. In other words, the truncation detection module 334 may check one or more memory commands and its scheduled execution timing against the refresh window timing of the relevant memory area to determine if truncation of a restore would enable energy savings without sacrificing data persistence in the memory area. A process for evaluating and detecting memory commands that would benefit from this truncation based on an awareness of the refresh window is described in more detail in FIGS. 5, 9, and 10. This process may be called refresh window aware restore truncation (RWA-RT).

In some embodiments, the processor(s) 304 executing the refresh reduction module 336 may be configured to monitor upcoming memory access commands in the read/write management module 332 and may detect one or more commands that would be a candidate for further energy saving by increasing a refresh rate together with a restore truncation (RT). The refresh reduction module 336 may include instructions for detecting one or more parameters associated with a memory command that correspond to an overall reduction of energy if a truncated restore is performed to a voltage level that corresponds to a different refresh rate and the refresh rate is updated. A process for evaluating and detecting memory commands that would benefit from this refresh truncation and an increased refresh rate based on an awareness of the refresh window and the timing of the memory command is described in more detail in FIGS. 6 and 8-10.

In some embodiments, the processor(s) 304 executing the table management module 338 may be configured to periodically update tables (e.g., timing tables 150) recording one or more parameters that may define features of one or more rows of memory or one or more bins of memory. The table management module 338 may be configured to automatically update one or more of the tables of parameters upon a change in the refresh rate. The table management module 338 may be configured to allocate local cache or dedicated DRAM to these tables upon start up. The table management module 338 of the refresh timing module 330 may manage one or more tables of flags that indicate a subwindow of a refresh window that corresponds to each memory row's position in the charge decay curve.

The description of the functionality provided by the different modules 330-338 is for illustrative purposes, and is not intended to be limiting, as any of modules 330-338 may provide more or less functionality than is described. For example, one or more of modules 330-338 may be eliminated, and some or all of its functionality may be provided by other modules from modules 330-338 or sub-controllers 120-140. As another example, processor(s) 304 may execute one or more additional modules that may perform some or all of the functionality attributed below to one of modules 330-338.

Figure 4:
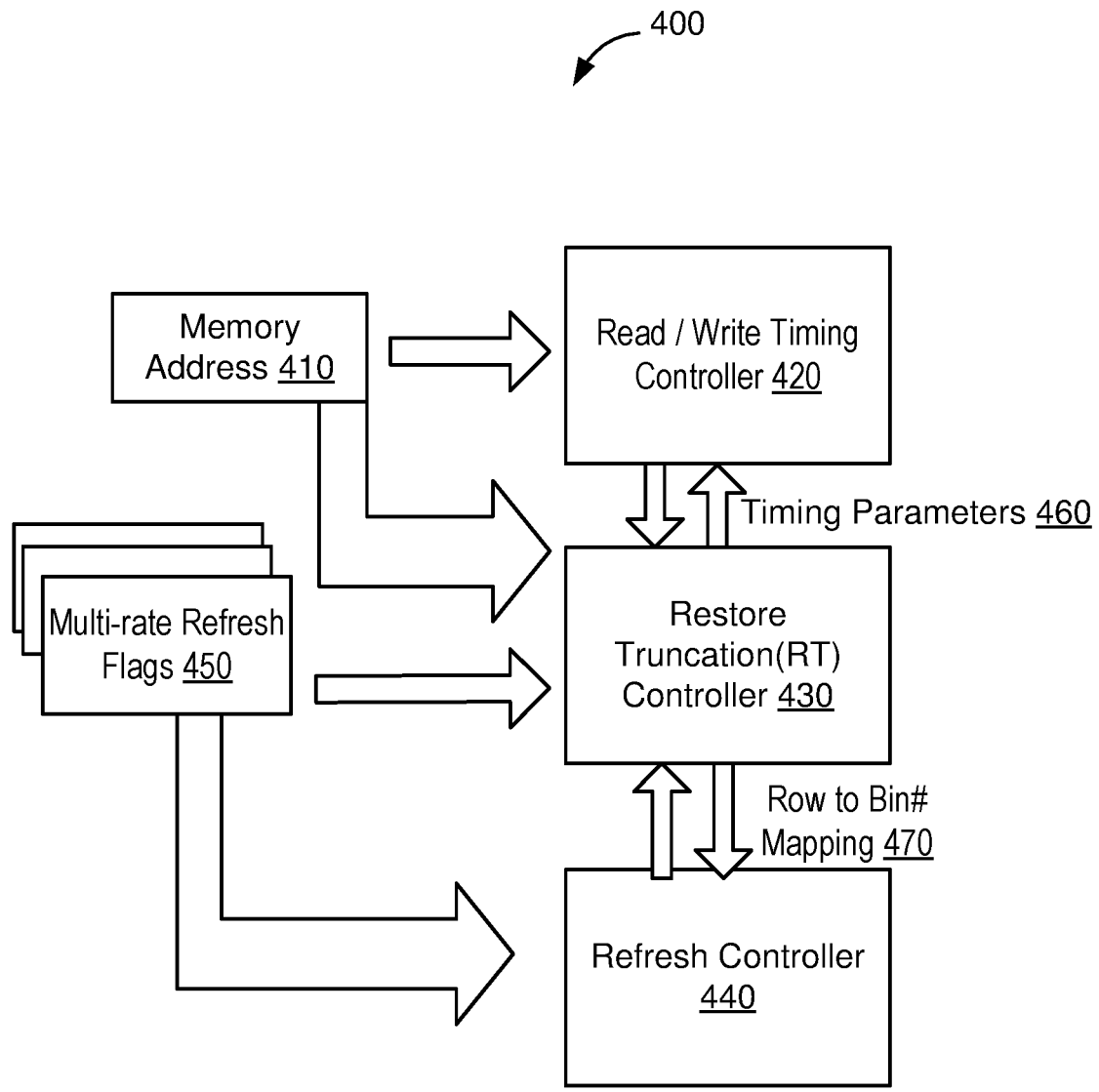
FIG. 4 is a component block diagram illustrating an example system configured for saving memory refresh energy according to some embodiments.

FIG. 4 is an information flow and operations diagram illustrating an example of restore truncation and increased refresh rate adjustments according to some embodiments. With reference to FIGS. 1-4, a memory controller 400 (e.g., 110) of an SoC (e.g., SoC 202) may be communicably connected to memory (e.g., DIMMs 108). The memory controller 400 may include one or more processors in a processing system configured to execute computer code to implement computing operations. The sub-controllers 420-440 may each be configured to send and receive signals to each other, which may include computing data and/or computing instructions. As noted above, various embodiments may be implemented in hardware, software executing in one or more processors, firmware executing in one or more processors, or a combination hardware and one or more processors executing software or firmware.

The read/write timing controller 420 (e.g., 120) may receive a memory address 410 as part of a memory access command from an application or processor of the SoC (e.g., 202). Based on one or more received memory access commands, the read/write controller 420 may determine a schedule for the memory accesses and assign a timing to each of the memory accesses. This schedule may be transmitted to the RT controller 430 and the refresh controller 440 as timing parameters 460 so that these controllers can evaluate if one or more memory accesses qualify for restore truncation and/or increased refresh rate adjustments. If a refresh rate is adjusted, the read/write timing controller may receive updated timing parameters 420 (even though the timing of the memory access may remain unchanged).

Likewise, the RT controller 430 (e.g., 130) may receive the memory address 410 corresponding to a memory access command received at the memory controller 400. Based on timing parameters 460 which indicate the schedule for the memory access at the address, the RT controller 430 may evaluate the scheduled execution time relative to a decay curve or an approximation of a decay curve for the addressed memory. The RT controller 430 may evaluate the scheduled execution time relative to a plurality of sub-windows of the refresh window of the addressed memory, where the sub-windows indicate a relative position along the decay curve and where different voltage savings may be achieved at different sub-windows. These aspects are illustrated further via the examples in FIGS. 5-6.

The RT controller 430 (or together with read/write timing controller 420) may program the timing (e.g., tRAS, tWR, tRCD) for a memory access. The RT controller 430 may manage a register or table tracks the next bin (Binc) to be refreshed, and which rolls over every 64 ms. Incoming row addresses (e.g., memory address 410) may be mapped to bin numbers at the RT controller 430 since the RT controller may manage bin tables and information. Based on the corresponding bin for the memory access and the schedule of bin refreshes, the RT controller decides which sub-window within the refresh window the memory address 410 belongs to. The associated timing parameters 460 may then be provided to the read/write timing controller 420.

The RT controller 430 and the refresh controller 440 (e.g., 140) may receive multi-rate refresh flags 450 that indicate that one or more DIMMs 108 are capable of operating at various refresh rates. Further, the refresh controller 440 may receive a row to bin number mapping from the RT controller 430, which may be used to identify the refresh rate which may be set on a per bin level. For example, the RT controller 430 may determine the one or more memory rows being accessed based on the memory address and may map those memory rows to their corresponding bin numbers (e.g., via a look up table). The refresh controller 440 may then determine based on the refresh rate for the bin whether energy can be saved overall by increasing a refresh rate and implementing restore truncation (e.g., truncating the restore voltage even more). If a refresh rate is updated, the affected bins may be updated by the RT controller 430 and updated timing parameters 460 may be supplied to the read write timing controller 420.

Figure 5:
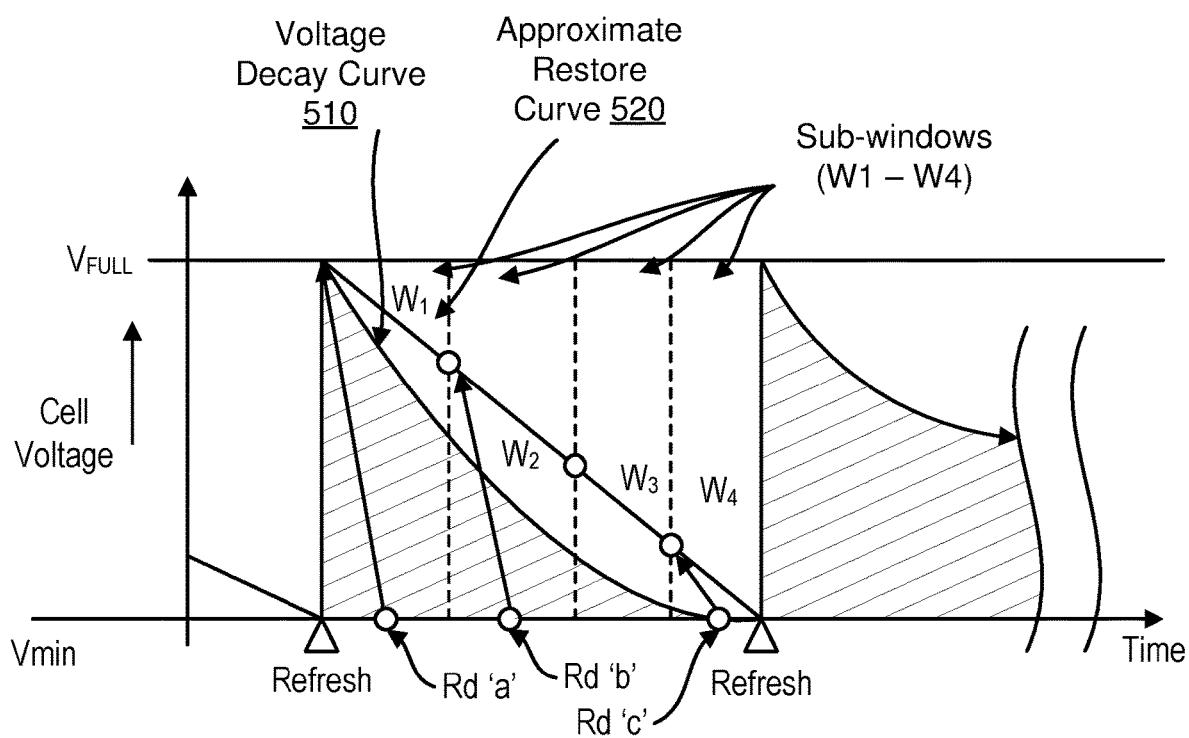
FIG. 5 is a timing diagram illustrating relationships between voltage decay and refreshes over time according to some embodiments.

FIG. 5 is a timing diagram illustrating relationships between voltage decay and refreshes over time according to some embodiments. With reference to FIGS. 1-5, the graph in FIG. 5 illustrates a cell voltage on a Y-axis and time on the X-axis. In the diagram, the voltage oscillates between a Vmin and a Vfull, in which Vmin indicates the minimum voltage level at which data (e.g., 1 or 0) remains readable or detectable from the memory cell. The refresh window of the memory cell may correspond to the time between the two refreshes (e.g., the two points where cell voltage reaches Vmin).

The refresh window may be divided into a number of sub-windows (e.g., W1, W2, W3, W4) that each correspond to a region of the voltage decay curve 510. The voltage decay curve 510 may be approximated as illustrated by the approximate restore curve 520. In other words, in order for the memory cell to retain Vmin by the time the refresh is performed, different amounts of voltage are required to be applied to the cell in each window and at each point along the voltage decay curve 510.

Typically, a read command (e.g., Rd 'a') will be destructive and drain the memory cell requiring a refill and the DRAM controller 110 will refill the cell to Vfull. Indeed conventionally, this refill or restore to Vfull is performed regardless of the time at which the read command occurs in the refresh window. As can be seen, especially in the third and fourth sub-windows, the Vfull level of cell voltage is much higher than the needed voltage for the cell data to remain viable which is indicated by the voltage decay curve 510. Thus, remaining energy above Vmin that is present in the cell at the time of the voltage refresh at the end of the refresh window is wasted energy.

To reduce this wasted energy, the DRAM controller 110 may monitor the position of the cell/row/bin along the decay curve 510 or the location of each bin of memory's time position within a sub-window (e.g., based on a row/cell to bin conversion). Accordingly, when a memory access command is processed that corresponds to a particular bin or row, the current sub-window of the row/bin is checked and a truncated restore voltage is calculated or retrieved. For example, when read command (e.g., Rd 'a') is processed, the DRAM controller 110 may determine that the memory access is in the first sub-window (W1) and may not truncate the voltage in accordance with a conservative setting for the voltage needed to maintain the cell data. As another example, when the read command (Rd 'b') is processed, the DRAM controller 110 may determine that the memory access is occurring in a second sub-window (W2) and may truncate the restore voltage to a particular level such as the point where the beginning of the second window intersects the approximate restore curve 520, where the approximate restore curve 520 represents a conservative setting for the voltage needed to maintain the cell data. As another example, a read command (Rd 'c') may be processed and the DRAM controller 110 may determine that the memory access is occurring in a fourth sub-window (W4) and may truncate the restore voltage to a particular level such as the point where the beginning of the fourth window intersects the approximate restore curve 520.

As illustrated, a truncated voltage restore set point may be associated with each sub-window (W1-W4) based on the approximate restore curve 520. These set points for truncated restores may enable the DRAM controller 110 to retrieve the truncation voltage along with the sub-window of the relevant bin/row from a look up table. The set point for the truncated restore may be calculated based on the sub-window or timing within the refresh window using the approximate restore curve 520 or other approximation. The voltage difference between the truncated restore voltage and the full voltage (Vfull) may be the voltage saved by the truncation process.

Refresh window aware-restore truncation (RWA-RT) may assume a worst-case scenario, i.e., the currently accessed row has weak cells that barely meet timing constraints and these weak cells are leaky enough that their voltage levels are reduced to Vmin before the next refresh. The weak cells are difficult to restore because fully charging them requires long latency. The adjusted restore timings (e.g., in Table 1 of FIG. 10) or the approximate restore curve 520 may ensure that slow and leaky cells can accumulate charge more than what they have under natural decay, i.e., are not accessed in one refresh window.

Due to a slightly faster rate of leakage at higher voltage, a DRAM cell has an exponential decay curve that is close but always below the linear line between Vfull and Vmin (e.g., approximate restore curve 520). This voltage decay curve 510 varies from row-to-row, which may mean that different restore timing values are needed. To simplify the control in a memory controller, RWA-RT may conservatively set up the voltage restore targets at the beginning of each sub-window as the voltage levels on the linear line rather than on the exponential decay curve. This may allow restore truncation (RT) to apply the same timing parameters for all rows of a memory access.

Figure 6:
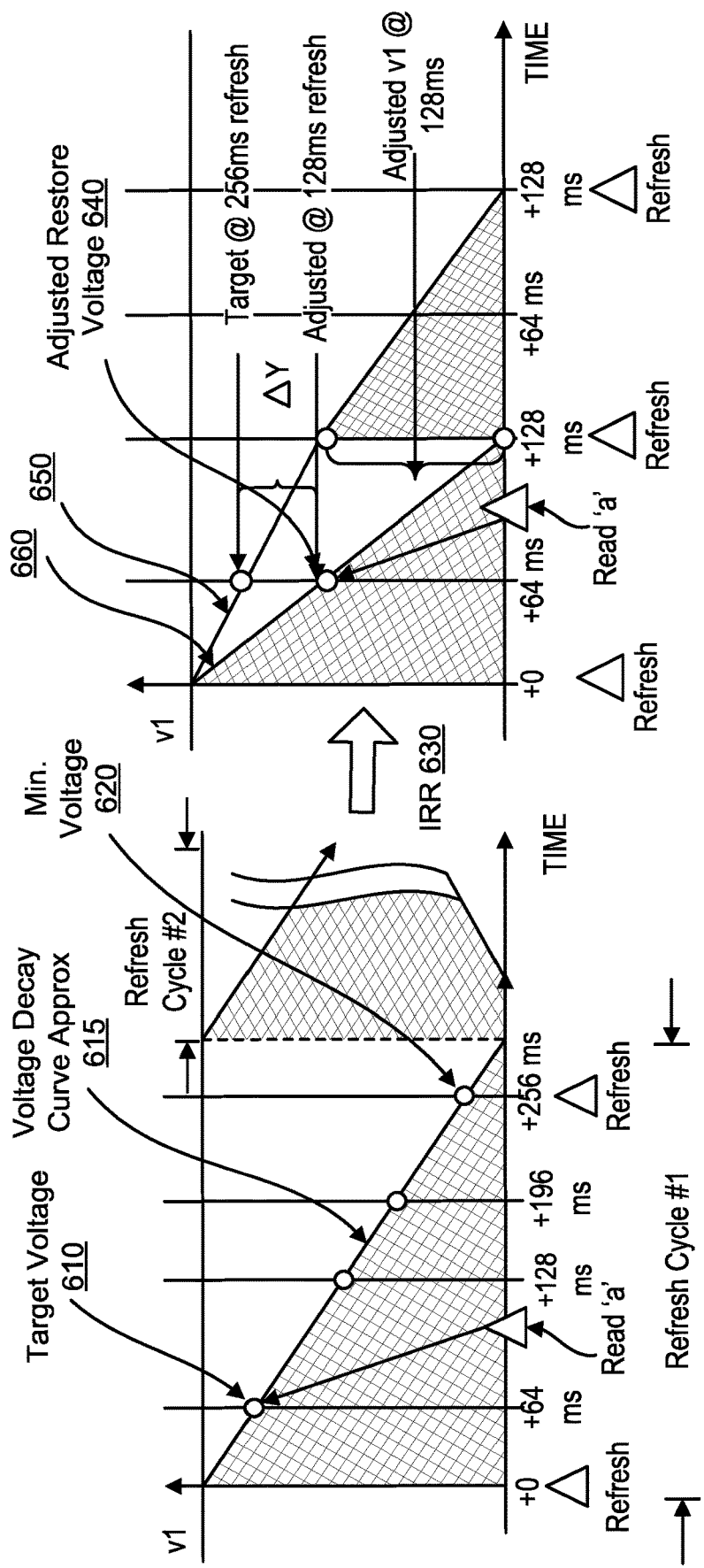
FIG. 6 is a timing diagram illustrating relationships between voltage decay and refreshes over time according to some embodiments.

FIG. 6 is a timing diagram illustrating relationships between voltage decay and refreshes over time according to some embodiments. With reference to FIGS. 1-6, the graph in FIG. 6 illustrates a cell voltage on a Y-axis and time on the X-axis and further illustrates the change in timings and voltages after a refresh rate increase. In FIG. 6, two graphs are illustrated: a first one with a refresh window of 256 ms and second one with a refresh window of half that or 128 ms. These graphs depict the additional energy savings that may be accomplished via an increased refresh rate together with a restore truncation for a memory access in particular regions of the refresh cycle.

As illustrated in FIG. 5, the refresh cycle #1 of FIG. 6 may be divided into four sub-windows, where the refresh window may be 256 ms long. The voltage decay curve approximation 615 for the refresh cycle may be calculated based on a straight line from the full refresh voltage (v1) to a minimum voltage 620 that may be the lower limit of cell charge detectability. After the refresh at the end of the 256 ms cycle, some time may be taken by the refresh operation as illustrated. A read command (read 'a') that occurs in a second sub-window may be determined to be a candidate for restore truncation and as illustrated the voltage savings may be the difference between the target voltage 610 and a full voltage restore (v1).

In addition, the DRAM controller 110 may determine that an increased refresh rate (IRR) 630 may result in further truncation and further energy savings. Conventionally an increase in a refresh rate would typically increase average energy usage by a memory bin or a dual in-line memory module (DIMM). In this case, however, restore truncation allows an increased refresh rate to become a tool for further energy savings. Specifically, after IRR 630 the new voltage decay curve approximation 660 may be steeper extending from the higher refresh voltage (v1) to a refresh at 128 ms instead of 256 ms. In other words, the IRR 630 steepens the approximated voltage delay curve due to the quicker refresh such that all points on the IRR curve (e.g., 660) may be less than (depicted underneath 650) the decay curve at the longer refresh rate. Thus, at each sub-window, voltage savings can be realized since the refresh voltage for IRR is less than that for the original refresh rate.

Refreshes (REF) and restores are two related operations that determine the charge in a cell. As illustrated in FIG. 6, the IRR 630 may enable the restore for the read command (Read 'a') to be truncated to an adjusted restore voltage 640 that is based on the new voltage decay curve approximation 660 and not the old 256 ms decay approximation 650. The energy savings from this additional truncation (below the truncation available based on the old 256 ms decay approximation 650) is illustrated as delta Y ($\Delta Y$). In other words, the target restore voltage after truncation at a 256 ms refresh rate is illustrated and an adjusted target restore voltage after additional truncation at a 128 ms refresh rate is also illustrated with a delta Y being the difference.

An IRR (e.g., IRR 630) together with restore truncation may provide further energy trimming opportunities. Less-frequently refreshed memory bins may be exploited further to shorten the post-access restoration time by "selectively" increasing the refresh rate. The additional refresh after 128 ms may require less charging time due to its lower refresh voltage level (v1) and so may provide a timing advantage relative to a 256 ms refresh as well. While upgrading refresh rate may reduce restore time, the increased rate may generate more real refresh commands, which may prolong increase the memory unavailable periods and may consume more refresh energy. The increased refresh may consume over 20% of the total memory energy for a set of DIMMs (e.g., a 32 Gb DRAM device). The refresh rate may then be changed back to a default or prior refresh rate after the increased rate within a single refresh rate period (e.g., 256 ms). This automatic reversion may enable selective energy and time savings based on individual determinations that advantages outweigh costs. These aspects are described in more detail with reference to FIGS. 10-11 below.

Figure 7:
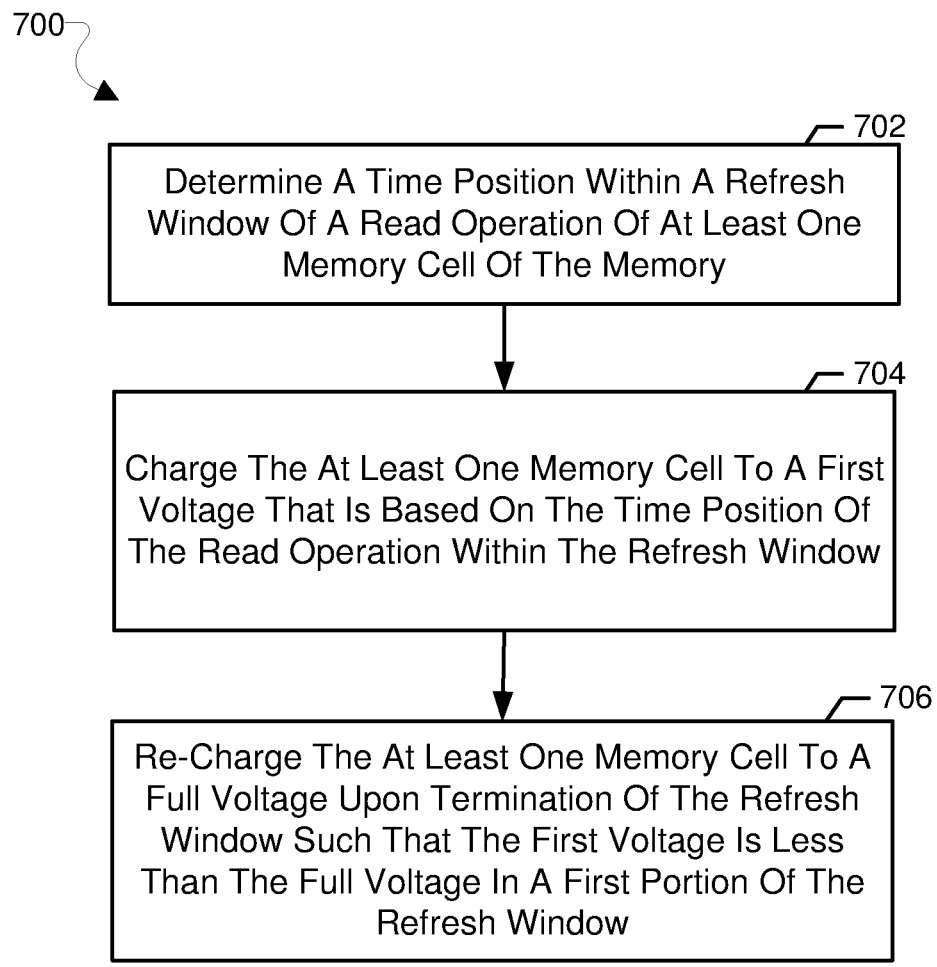
FIG. 7 is a process flow diagram of an example method for energy saving in memory voltage refreshes in accordance with some embodiments.

FIG. 7 is a process flow diagram of an example method 700 that may be performed by a DRAM controller 110 or one or more of its sub-components (e.g., refresh controller 120) for energy saving during refreshes and restores in accordance with various embodiments. With reference to FIGS. 1-7, the method 700 may be performed by a DRAM controller 110 and DIMMs 108 of a computing device (e.g., system 100, computing device 300). The DRAM controller may include one or more processors in a processing system (e.g., processor 218) one or more of which may be configured by processor-executable instructions stored in a non-transitory processor-readable medium (e.g., memory 220) to perform operations of the method 700. Operations of the method 700 may be implemented in hardware, software executing in one or more processors, firmware executing in one or more processors, or a combination hardware and one or more processors executing software or firmware. Means for performing the operations of the method 700 may be the DRAM controller, the processor or processing system, and/or the like as described with reference to FIGS. 1-7. In order to encompass the alternative configurations enabled in various embodiments, the hardware implementing the method 700 is referred to herein as a "processing system." Means for performing the functions of the operations in the method 700 may include a processing system including one or more of processors 210, 212, 214, 216, 218, 222, 252, 260, and other components described herein.

In block 702, a processing system (e.g., a DRAM controller of a computing device) may determine a time position within a refresh window of a read operation of at least one memory cell of the memory (e.g., DIMMs 108). In some embodiments, this determination may be triggered by receiving the read command at the DRAM controller. In some embodiments, this determination may include determining that the read operation is received within one of at least three portions of the refresh window. In some embodiments, this determination may include performing a table look-up process accessing a lookup table that maps a charge decay of the at least one memory cell to the time position of the read operation within the refresh window that is currently assigned. The memory may be configured to operate at two or more refresh rates such that a refresh rate for the at least one memory cell is adjustable prior to charging the at least one memory cell to further reduce an amount of the first voltage.

In block 704, the processing system may charge the at least one memory cell to a first voltage that is based on the time position of the read operation within the refresh window. The first voltage is less than a full voltage recharge in a first portion of the refresh window. In some embodiments, this charging may be part of a restore operation in memory and may be performed on a row-by-row basis or a bin-by-bin basis. The first voltage may be sufficient for the at least one memory cell to remain readable at an end of the refresh window. In some embodiments, the first voltage to which the at least one memory cell is charged when a read operation occurs in a first portion of the refresh window may be greater than a second voltage to which the at least one memory cell is charged when a read operation occurs in a second portion of the refresh window that is later than the first portion. In some embodiments, receiving the read operation in the first portion of the refresh window may correspond to the first voltage, and receiving the read operation in a second portion of the refresh window before the first portion may correspond to a second voltage higher than the first voltage. The voltage requirements for read operations at different refresh rates may be provided as decay timing parameters, and charging the at least one memory cell to the first voltage based on the time position of the read operation within the refresh window may include comparing the time position to the decay timing parameters.

In block 706, the processing system may re-charge the at least one memory cell to a full voltage upon termination of the refresh window,. The recharge to the full voltage may be a voltage refresh operation in memory and may be performed on a row-by-row basis or a bin-by-bin basis. The charge to the first voltage in block 704 may be less than the full voltage recharge in block 706.

Figure 8:
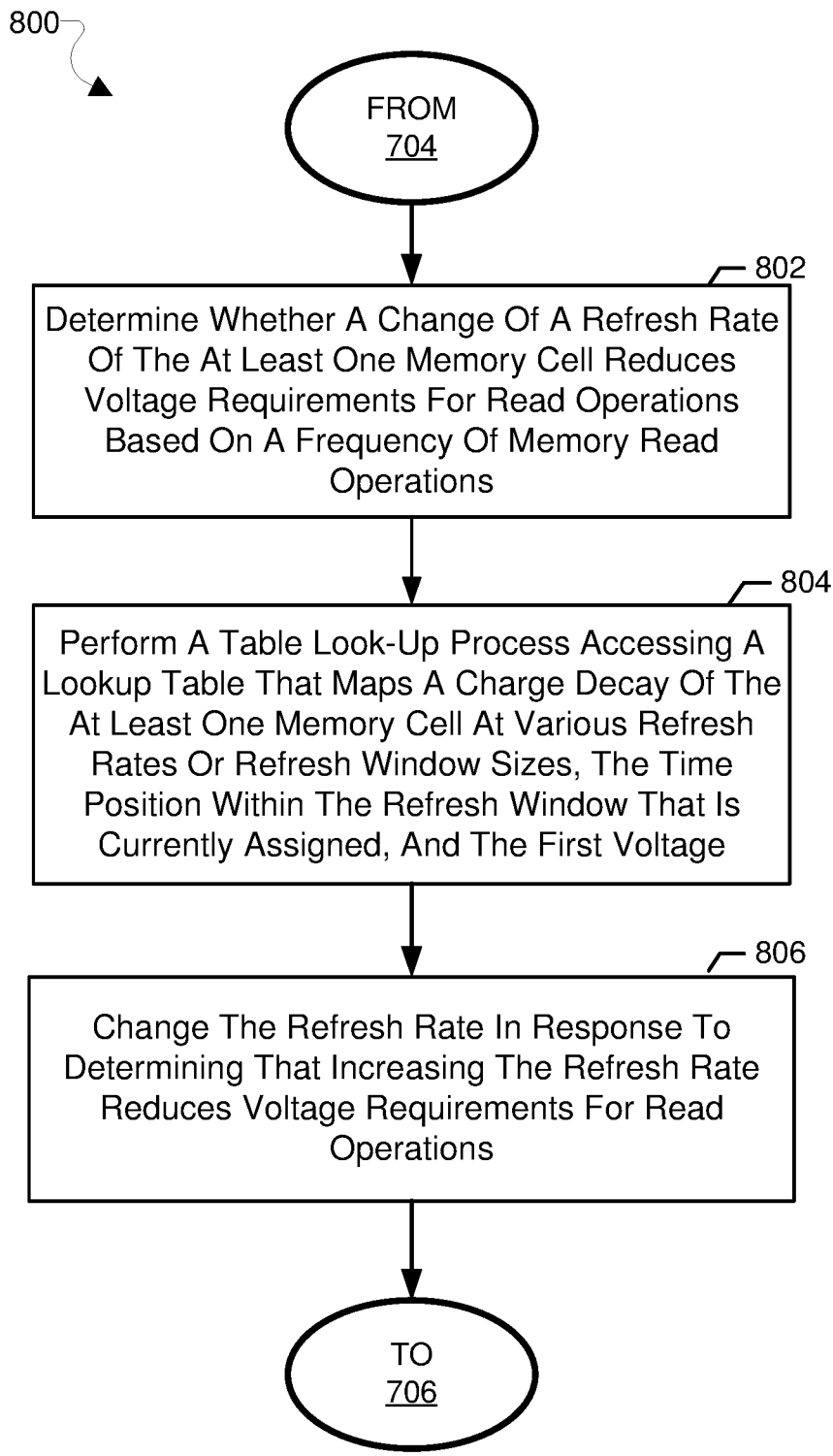
FIG. 8 is a process flow diagram of an example method for energy saving in memory voltage refreshes in accordance with some embodiments.

FIG. 8 is a process flow diagram of an example method 800 that may be performed by a DRAM controller 110 or one or more of its sub-components (e.g., refresh controller 120) for energy saving during refreshes and restores in accordance with various embodiments. With reference to FIGS. 1-8, the method 800 may be performed by a DRAM controller 110 and DIMMs 108. The DRAM controller may include one or more processors in a processing system (e.g., processor 218) one or more of which may be configured by processor-executable instructions stored in a non-transitory processor-readable medium (e.g., memory 220) to perform operations of the method 800. Operations of the method 800 may be implemented in hardware, software executing in one or more processors, firmware executing in one or more processors, or a combination hardware and one or more processors executing software or firmware. Means for performing the operations of the method 800 may be the DRAM controller, the processor or processing system, and/or the like as described with reference to FIGS. 1-8. In order to encompass the alternative configurations enabled in various embodiments, the hardware implementing the method 800 is referred to herein as a "processing system." Means for performing the functions of the operations in the method 800 may include a processing system including one or more of processors 210, 212, 214, 216, 218, 222, 252, 260, and other components described herein.

In block 802, the method 800 may continue from block 704 of FIG. 7 and the processing system may determine whether a change of a refresh rate of the at least one memory cell reduces voltage requirements for read operations based on a frequency of memory read operations. The voltage requirements for read operations may be less than the full voltage and the first voltage, and the voltage requirements for read operations after changing the refresh rate may be substantially equal to a voltage level required to reach an end of a new, shorter refresh window and retain readability of the at least one memory cell.

In block 804, the processing system may perform a table look-up process accessing a lookup table that maps a charge decay of the at least one memory cell at various refresh rates or refresh window sizes, the time position within the refresh window that is currently assigned, and the first voltage. In some embodiments, determining whether a change of a refresh rate of the at least one memory cell reduces voltage requirements for read operations based on a frequency of memory read operations may include performing a table look-up process accessing a lookup table that maps a charge decay of the at least one memory cell at various refresh rates or refresh window sizes, the time position within the refresh window that is currently assigned, and the first voltage.

In block 806, the processing system may change the refresh rate in response to determining that increasing the refresh rate reduces voltage requirements for read operations. In some embodiments, the processing system may automatically revert the refresh rate back to the prior lower rate after the termination of the original, longer refresh window. The method 800 may then continue to block 706 of FIG. 7 as described with respect to method 700.

In some embodiments, the method 800 may be implemented in parallel (or together) with the method 700 described with reference to FIG. 7. For example, the processing system implementing the method 700 may be the same as a processing system (e.g., DRAM controller and/or part of the computing device) described in the method 800, and the DIMMs implementing the method 700 may be the same as the DIMMs and/or part of the memory described for the method 800.

Figure 9:
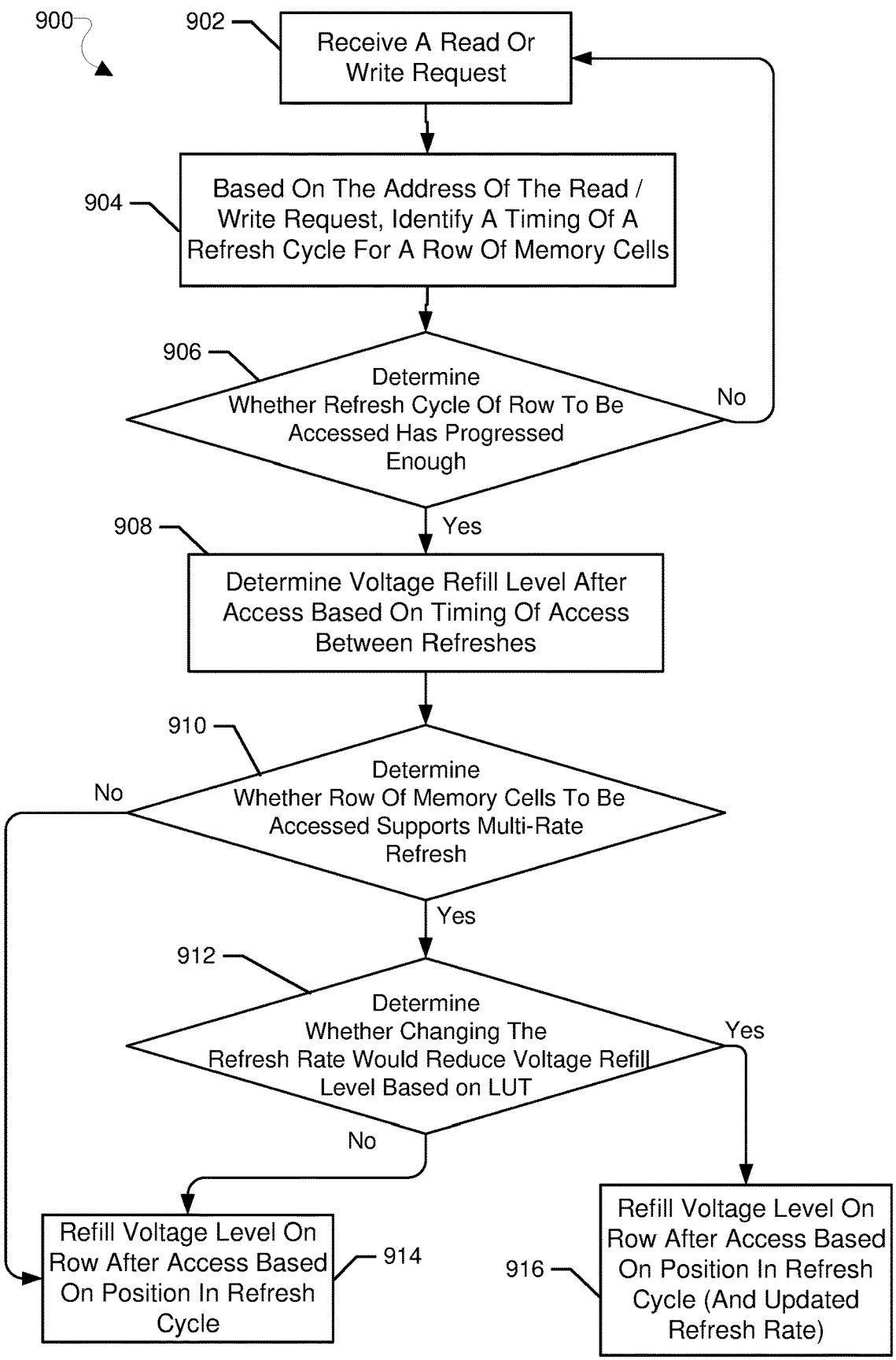
FIG. 9 is a process flow diagram of an example method for energy saving in memory voltage refreshes in accordance with some embodiments.

FIG. 9 is a process flow diagram of an example method 900 that may be performed by a DRAM controller 110 or one or more of its sub-components (e.g., refresh controller 120) for energy saving during refreshes and restores in accordance with various embodiments. With reference to FIGS. 1-9, the method 900 may be performed by a DRAM controller 110 and DIMMs 108 of a computing device (e.g., system 100). The DRAM controller may include one or more processors in a processing system (e.g., processor 218) one or more of which may be configured by processor-executable instructions stored in a non-transitory processor-readable medium (e.g., memory 220) to perform operations of the method 900. Operations of the method 900 may be implemented in hardware, software executing in one or more processors, firmware executing in one or more processors, or a combination hardware and one or more processors executing software or firmware. Means for performing the operations of the method 900 may be the DRAM controller, the processor or processing system, and/or the like as described with reference to FIGS. 1-9. In order to encompass the alternative configurations enabled in various embodiments, the hardware implementing the method 900 is referred to herein as a "processing system." Means for performing the functions of the operations in the method 900 may include a processing system including one or more of processors 210, 212, 214, 216, 218, 222, 252, 260, and other components described herein.

In block 902, the processing system (e.g., a DRAM controller) executing method 900 may receive a read or write request or other memory access request. The memory access request may be a destructive request which would drain the energy from a memory cell/row/bin in order to perform the request. The DRAM controller may include a restore operation as part of the destructive memory access operation.

In block 904, based on the address of the read/write request, the processing system executing method 900 may identify a timing of a refresh cycle for a row of memory cells. The identification of the timing may include identifying the timing of the memory access within a refresh window.

In determination block 906, the processing system may determine whether the refresh cycle of the row has progressed enough to allow for truncation of a restore operation after the memory access. That is, the processing system may determine whether the refresh cycle has progressed enough towards the next refresh that truncation of the restore operation to enable energy savings while retaining memory data in the row.

In response to determining that the refresh cycle of the row has not progressed enough to allow for truncation of a restore operation after the memory access (i.e., determination block 906="No"), the processing system may evaluate the next memory access operation in block 902 as described.

In response to determining that the refresh cycle of the row has progressed enough to allow for truncation of a restore operation after the memory access (i.e., determination block 906="Yes"), the DRAM controller may determine a voltage refill level after the memory access based on a timing of the memory access between refreshes in block 908. In other words, the DRAM controller may determine a voltage refill level that is truncated or less than the full restore level.

In determination block 910, the processing system may check one or more flags or parameters to determine whether a row of memory cells to be accessed supports multi-rate refresh or multiple different refresh rates for the DIMM.

In response to determining that a row of memory cells to be accessed does not support multi-rate refresh or multiple different refresh rates for the DIMM (i.e., determination block 910="No"), the processing system may refill the voltage level of the accessed row after access in block 914 based on the position of the access in the refresh cycle as determined in block 908.

In response to determining that a row of memory cells to be accessed supports multi-rate refresh or multiple different refresh rates for the DIMM (i.e., determination block 910="Yes"), the processing system may determine whether changing the refresh rate (together with truncation as in block 908) would reduce the voltage refill level based on a look up table (LUT) in determination block 912. This determination may compare the reduced voltage refill level to the determined voltage refill level of block 908.

In response to determining that changing the refresh rate would not reduce the voltage refill level based on the LUT (i.e., determination block 912="No"), the processing system may refill the voltage level of the accessed row after access in block 914 based on the position of the access in the refresh cycle as determined in block 908.

In response to determining that changing the refresh rate would reduce the voltage refill level based on the LUT (i.e., determination block 912="Yes"), the processing system may refill a voltage level on a row after the memory access based on the position of the access in the refresh cycle and based on the updated refresh rate in block 916. In other words, the DRAM controller may update the refresh rate to an increased rate based on the LUT and may refill the voltage level based on the position within that updated cycle under the new rate. The energy savings in block 916 may be greater than the energy savings in block 914 and the outcome may depend on whether multi-rate refresh is supported and the timing position of the memory access in the refresh cycle.

FIG. 10 is a series of tables illustrating example parameters for selecting voltage levels in accordance the various embodiments. With reference to FIGS. 1-10, various embodiments may include multi-rate DIMMs that may be characterized as illustrated in the example tables of Table 1, Table 2, and Table 3. These example tables may be referenced by the DRAM controller 110 or sub-components thereof to determine whether restore truncation and increased refresh rates save energy for a particular restore operation.

Table 1 illustrates a look up table (LUT) that splits a refresh window into four sub-windows ($1^{st}$, $2^{nd}$, $3^{rd}$, 4th) (e.g., W1-W4) and provides various timing parameters for these windows for 64 ms refresh rates, 128 ms refresh rates, and 256 ms refresh rates, for example. The LUT may be generated based on the specifications for the DRAM memory (e.g., a double data rate (DDR) memory specification) or a simulation of such memory at different refresh rates (e.g., spice simulation). Each window, which may vary in timing depending on the refresh rate, may correspond to a target restore voltage (Vdd) and one or more timing parameters for the DRAM cycle (e.g., tRAS, tWR, tRCD). The last row lists a target restore voltage to be applied without the truncation process and associated timing parameters. As illustrated in FIG. 5, the first sub-window of the refresh window corresponds to target restore voltage that is equivalent to the full voltage (e.g., 0.975) of the restore without truncation. The second, third, and fourth sub-windows provide energy savings if truncation is implemented based on this table. Accesses falling into different sub-windows may use different sets of timing parameters, while accesses falling in same sub-windows use same set of timing parameters as shown in each row of Table 1.

The DRAM controller implementing RWA-RT may use the following formula to calculate the time distance to the next refresh command and determine the sub-window corresponding to the memory access. A distance from next refresh window=$((8192+Bin_c-Bin_a)/8192+1)*64$ ms/8192, where 64 ms is the refresh rate, 8192 is for 8k sized bins, $Bin_c$ is the last bin that was refreshed, and $Bin_a$ is the refresh bin to which the row being accessed belongs (hereinafter Equation 1). The DRAM controller may then truncate the restore operation using the adjusted timing parameters, e.g., the right most column in Table 1.

DRAM may be refreshed periodically to prevent data loss using the parameters listed above. According to JEDEC, an 8K all-bank auto-refresh (REF) commands may be sent to all DRAM devices in a rank within one retention time interval (Tret), also called one refresh window (tREFW), which may be 64 ms for DDRx. The gap between two REF commands may be called a refresh interval (tREFI) which may be 7.8 us based on 64 ms divided by 8K. If a DRAM device has more than 8K rows, rows may be grouped into 8K refresh bins. One REF command may be used to refresh multiple rows in a bin. An internal counter in each DRAM device may track the designated rows to be refreshed upon receiving REF. The refresh operation may take tRFC to complete, which proportionally depends on the number of rows in the bin. The refresh rate of one bin may be determined by the leakiest memory cell in the bin.

In multi-rate scenario, the above calculation may be adjusted to include the further 64 ms refresh rounds. The above calculation may need the mapping from row address being accessed to bin address as illustrated in FIG. 4. While the bin counter may be maintained in the memory controller and incremented sequentially, the actual row addresses (responding to each bin-refresh command) are generated internally inside memory devices. This mapping may be non-linear because of DRAM manufacturer's full flexibility to implement the refresh operation. A DRAM controller may implement row to bin number mapping based on a row address strobe (RAS)-only refresh.

Table 2 provides a look up table for various increases in refresh rates (where increase means increased frequency of refreshes). For each upgrade or increase in refresh rate, the table may provide one or two options or rows depending on the position of the memory access in the un-upgraded refresh window. For each row corresponding to a sub-window in the refresh window, Table 2 provides a target restore voltage (Vdd) which takes restore truncation into account and provides replacement timing parameters for the upgrade.

Refreshing a 256 ms-capable row at a128 ms rate may expose more truncation benefits. For a memory access (e.g., "Rd"), a DRAM controller may restore the row or cell voltage to 0.80Vdd rather than 0.86Vdd as per Table 1. This is because a 256 ms-row even if being refreshed at a 128 ms rate, is designed to leak slower than a row of memory only capable of a 128 ms refresh rate. Therefore, the timing parameters for increased rates (e.g., 128 ms) may provide improvement over DRAM that is limited to that refresh rate (e.g., 128 ms). In particular, as summarized in Table 2, for a row access, even if it is 128 ms away from the next refresh of the row being accessed, the DRAM controller may only restore the row to 0.86Vdd, rather than Vfull (=0.975Vdd) for a real 128 ms-row due to the improved decay parameters in the hardware of a 256 ms-capable DIMM.

Table 3 illustrates example changes to rate flags that may be stored to indicate to a DRAM controller the refresh rate of a particular memory bin (i.e., on a per-bin level). As shown in Table 3, a 64 ms/128 ms/256 ms bin is set as '000'/'01A'/'1BC', respectively. Here 'A' and 'BC' may be initialized to ones and may decrement every 64 ms. While the refresh bin counter increments every 7.8 μs (=64 ms/8K) to count a progression of the refreshes through each bin, a real REF command is sent to refresh the corresponding bin only if its bin flag is '000', '010', or '100'. 'A' and 'BC' may be changed back to '1' and '11' after the upgrade has completed a cycle, respectively.

When upgrading the refresh rate of a refresh bin, the DRAM controller may update the rate flag according to the last column in Table 3. For example, when upgrading a 128 ms-bin to a 64 ms rate, the DRAM controller may set the rate flag as '010', which triggers the refresh in the next 64 ms duration and may then automatically roll back to '011' afterwards. This effectively upgrades the refresh rate for one round. Upgrading a 256 ms-row to a 128 ms rate may set the flag as '1BC⊕0B0', which always sets the middle bit to zero to ensure that the refresh distance is never beyond 128 ms. Thus, for this upgrade, the sub-window of the memory access can only be the $3^{rd}$ and 4th sub-windows as defined by Table 1. In general, the distance calculation in RWA-RT may be adjusted by adding the result of Equation 1 for Table 1 together with further refresh rounds indicated by the two least significant bits (LSB) of the rate flag.

The decision (e.g., block 912) to increase the refresh rate (e.g., IRR 630) for a particular bin in order to implement IRR-RT may include the DRAM controller maintaining a counter for each bin while a multi-rate scheme is being applied to the memory bins. A read or write command in the particular refresh window may increment the counter (e.g., increase by 1). Once the value of the counter is more than one and the distance to the next refresh (as described in Equation 1 for Table 1) is falling into any one of the four windows of Table 1, then the DRAM controller may change the refresh rate conservatively to the next faster rate (e.g., divide rate by two) and may update the rate flags in Table 3 as shown the last column. Once the time of the original refresh (with rate increases) is reached, the DRAM controller may automatically revert the counter to zero (resetting the refresh rate).

FIG. 11 is a series of tables illustrating overhead for various monitoring and calculations in accordance with various embodiments. With reference to FIGS. 1-11, various embodiments may require overhead in memory to store parameters used in the calculations and tables described above. This overhead may be allocated memory space in a memory 220 of SoC 202 or in a cache of the DRAM controller 110/302 (e.g., 325). Table 4 corresponds to the overhead memory that may be required to implement refresh window aware restore truncation (RWA-RT) at design time for a series of three refresh intervals and including an equation in the last column for calculating other overhead permutations. Table 5 corresponds to the overhead memory that may be required to implement increased refresh rate restore truncation (IRR-RT) at design time for three refresh intervals. The last column of Table 5 includes an equation for calculating other overhead permutations based on the variables in the columns of the table. Table 6 corresponds to the overhead memory that may be required to constantly monitor 8K bins with one-bit counters in order for the DRAM controller to determine when to increase a refresh rate when IRR-RT is implemented as described with respect to Table 3 of FIG. 10. Table 7 corresponds to the overhead memory that may be required to constantly track the assigned refresh rate with three-bits for each memory bin in a DIMM with 8K bins.

Figure 12:
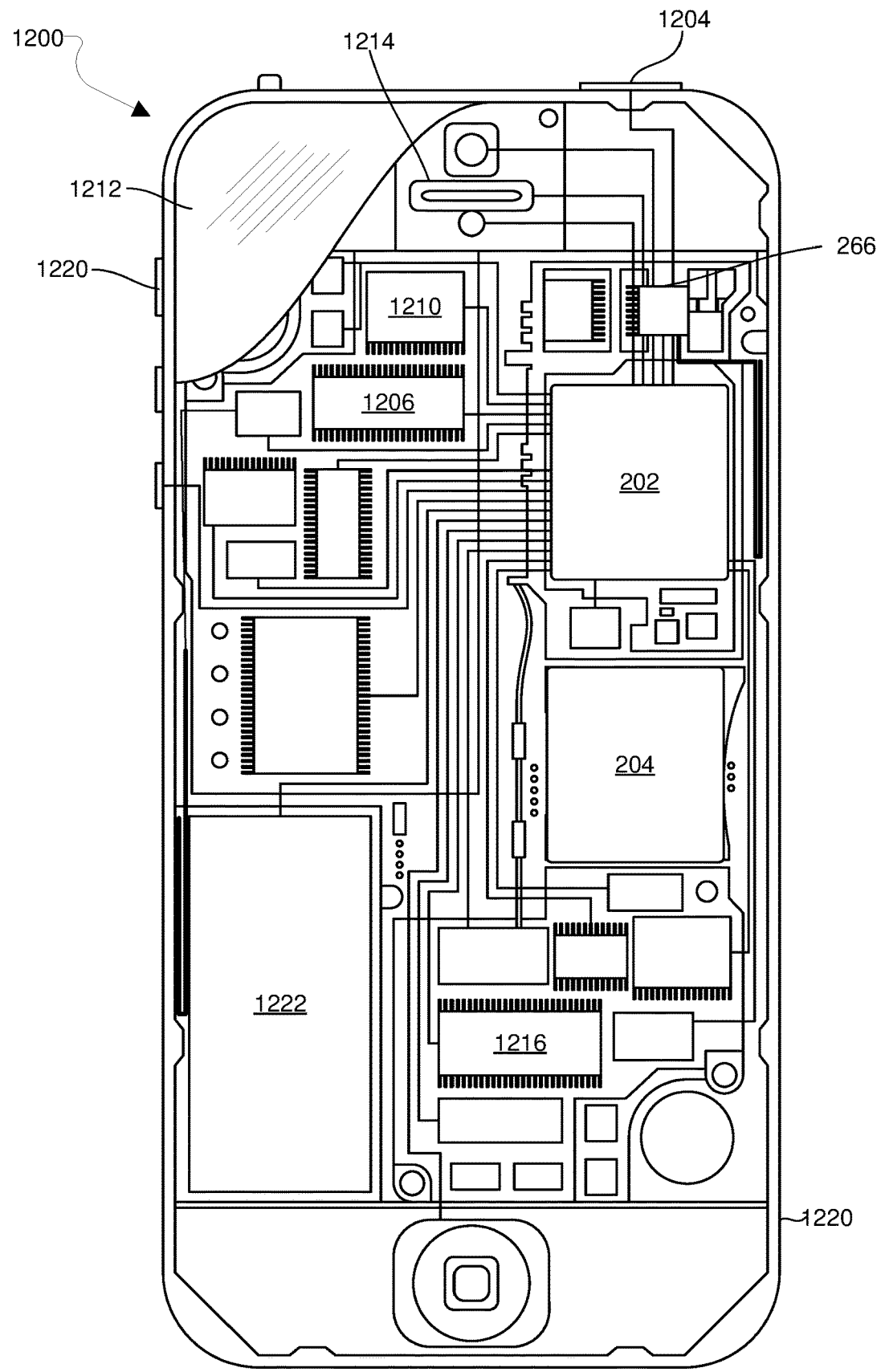
FIG. 12 is a component block diagram illustrating an example wireless communication device suitable for use with various embodiments.

FIG. 12 is a component block diagram of a computing device 1200 suitable for use with various embodiments. With reference to FIGS. 1-12, various embodiments may be implemented on a variety of computing devices 1200 (e.g., computing device 100, 200), an example of which is illustrated in FIG. 12 in the form of a smartphone. The computing device 1200 may include a first SoC 202 (e.g., a SoC-CPU) coupled to a second SoC 204 (e.g., a 5G capable SoC). The first and second SoCs 202, 204 may be coupled to internal memory 1206, 1216, a display 1212, and to a speaker 1214, and powered by a battery 1222.

The computing device 1200 may include an antenna 1204 for sending and receiving electromagnetic radiation that may be connected to a wireless transceiver 266 coupled to one or more processors in the first and/or second SoCs 202, 204. The computing device 1200 may also include menu selection buttons 1220 for receiving user inputs.

The computing device 1200 also includes a sound encoding/decoding (CODEC) circuit 1210, which digitizes sound received from a microphone into data packets suitable for wireless transmission and decodes received sound data packets to generate analog signals that are provided to the speaker to generate sound. Also, one or more of the processors in the first and second SoCs 202, 204, wireless transceiver 266 and CODEC 1210 may include a digital signal processor (DSP) circuit (not shown separately).

The processors of the computing device 1200, and the computing device 1200 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SoC 204 dedicated to wireless communication functions and one processor within an SoC 202 dedicated to running other applications. Software applications may be stored in memory 220, 1216 before they are accessed and loaded into the processor. The processors may include internal memory sufficient to store the application software instructions.

Implementation examples are described in the following paragraphs. While some of the following implementation examples are described in terms of example methods that may be performed in a computing device by a host controller, further example implementations may include: a computing device including a DRAM controller and DIMMs configured to perform the methods of the following implementation examples; a computing device including means for performing functions of the following implementation examples, a DRAM controller that includes a processor configured to perform the methods of the following implementation examples; and a non-transitory, processor-readable memory having stored thereon processor-executable instructions configured to cause a DRAM controller in a computing device configured to perform the methods of the following implementation examples.

Example 1. A method performed by memory control circuitry for control of memory charge restoration of a memory, including: determining a time position within a refresh window of a read operation of at least one memory cell of the memory; charging the at least one memory cell to a first voltage that is based on the time position of the read operation within the refresh window; and re-charging the at least one memory cell to a full voltage upon termination of the refresh window, in which the first voltage is less than the full voltage in a first portion of the refresh window.

Example 2. The method of example 1, in which the first voltage is sufficient for the at least one memory cell to remain readable at an end of the refresh window.

Example 3. The method of either examples 1 or 2, in which determining the time position of the read operation within the refresh window comprises determining that the read operation is received within one of at least three portions of the refresh window.

Example 4. The method of any of examples 1-3, in which the first voltage to which the at least one memory cell is charged when a read operation occurs in a first portion of the refresh window is greater than a second voltage to which the at least one memory cell is charged when a read operation occurs in a second portion of the refresh window that is later than the first portion.

Example 5. The method of any of examples 1-4, in which receiving the read operation in the first portion of the refresh window corresponds to the first voltage being applied, and in which receiving the read operation in a second portion of the refresh window before the first portion corresponds to a second voltage higher than the first voltage.

Example 6. The method of any of examples 1-5, further including: determining whether a change of a refresh rate of the at least one memory cell reduces voltage requirements for read operations based on a frequency of memory read operations; and changing the refresh rate in response to determining that increasing the refresh rate reduces voltage requirements for read operations.

Example 7. The method of example 6, in which determining whether a change of a refresh rate of the at least one memory cell reduces voltage requirements for read operations based on a frequency of memory read operations includes performing a table look-up process accessing a lookup table that maps a charge decay of the at least one memory cell at various refresh rates or refresh window sizes, the time position within the refresh window that is currently assigned, and the first voltage.

Example 8. The method of any of examples 6-7, in which the voltage requirements for read operations are less than the full voltage and the first voltage, and the voltage requirements for read operations after changing the refresh rate are substantially equal to a voltage level required to reach an end of a new, shorter refresh window and retain readability of the at least one memory cell.

Example 9. The method of any of examples 6-8, in which the voltage requirements for read operations at different refresh rates are provided as decay timing parameters, and in which charging the at least one memory cell to the first voltage that is based on the time position of the read operation within the refresh window includes comparing the time position to the decay timing parameters.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by memory control circuitry for control of memory charge restoration of a memory, comprising:
    determining a time position within a refresh window of a read operation of at least one memory cell of the memory;
    charging the at least one memory cell to a first voltage that is based on the time position of the read operation within the refresh window; and
    re-charging the at least one memory cell to a full voltage upon termination of the refresh window,
    wherein the first voltage is less than the full voltage in a first portion of the refresh window.

2. The method of claim 1, wherein the first voltage is sufficient for the at least one memory cell to remain readable at an end of the refresh window.

3. The method of claim 1, wherein determining the time position of the read operation within the refresh window comprises determining that the read operation is received within one of at least three portions of the refresh window.

4. The method of claim 3, wherein the first voltage to which the at least one memory cell is charged when a read operation occurs in a first portion of the refresh window is greater than a second voltage to which the at least one memory cell is charged when a read operation occurs in a second portion of the refresh window that is later than the first portion.

5. The method of claim 4, wherein receiving the read operation in the first portion of the refresh window corresponds to the first voltage being applied, and wherein receiving the read operation in a second portion of the refresh window before the first portion corresponds to a second voltage higher than the first voltage.

6. The method of claim 1, further comprising:
    determining whether a change of a refresh rate of the at least one memory cell reduces voltage requirements for read operations based on a frequency of memory read operations; and
    changing the refresh rate in response to determining that increasing the refresh rate reduces voltage requirements for read operations.

7. The method of claim 6, wherein determining whether a change of a refresh rate of the at least one memory cell reduces voltage requirements for read operations based on the frequency of memory read operations comprises performing a table look-up process accessing a lookup table that maps a charge decay of the at least one memory cell at various refresh rates or refresh window sizes, the time position within the refresh window that is currently assigned, and the first voltage.

8. The method of claim 6, wherein the voltage requirements for read operations are less than the full voltage and the first voltage, and the voltage requirements for read operations after changing the refresh rate are substantially equal to a voltage level required to reach an end of a new, shorter refresh window and retain readability of the at least one memory cell.

9. The method of claim 6, wherein the voltage requirements for read operations at different refresh rates are provided as decay timing parameters, and wherein charging the at least one memory cell to the first voltage that is based on the time position of the read operation within the refresh window includes comparing the time position to the decay timing parameters.

10. An apparatus, comprising:
    a memory; and
    a memory controller coupled to the memory and configured to:
        determine a time position within a refresh window of a read operation of at least one memory cell of the memory;
        charge the at least one memory cell to a first voltage that is based on the time position of the read operation within the refresh window; and
        re-charge the at least one memory cell to a full voltage upon termination of the refresh window,
        wherein the first voltage is less than the full voltage in a first portion of the refresh window.

11. The apparatus of claim 10, wherein the memory is configured to operate at two or more refresh rates such that a refresh rate for the at least one memory cell is adjustable prior to charging the at least one memory cell to further reduce an amount of the first voltage.

12. The apparatus of claim 10, wherein the memory controller is further configured to determine the time position of the read operation within the refresh window that are further configured to determine that the read operation is received within one of at least three portions of the refresh window.

13. The apparatus of claim 10, wherein the memory controller is further configured such that the first voltage to which the at least one memory cell is charged when a read operation occurs in a first portion of the refresh window is greater than a second voltage to which the at least one memory cell is charged when a read operation occurs in a second portion of the refresh window that is later than the first portion.

14. The apparatus of claim 10, wherein the memory controller is further configured such that:
    the received read operation in the first portion of the refresh window corresponds to the first voltage being applied; and
    the received read operation in a second portion of the refresh window before the first portion corresponds to a second voltage higher than the first voltage.

15. The apparatus of claim 10, wherein the memory controller is further configured to:
  determine whether a change of a refresh rate of the at least one memory cell reduces voltage requirements for read operations based on a frequency of memory read operations; and
  change the refresh rate in response to determining that increasing the refresh rate reduces voltage requirements for read operations.

16. The apparatus of claim 15, wherein the memory controller is configured to determine whether a change of a refresh rate of the at least one memory cell reduces voltage requirements for read operations based on the frequency of memory read operations that are further configured to perform a table look-up process accessing a lookup table that maps a charge decay of the at least one memory cell at various refresh rates or refresh window sizes, the time position within the refresh window that is currently assigned, and the first voltage.

17. The apparatus of claim 15, wherein the voltage requirements for read operations are less than the full voltage and the first voltage, and the voltage requirements for read operations after changing the refresh rate are substantially equal to a voltage level required to reach an end of a new, shorter refresh window and retain readability of the at least one memory cell.

18. An apparatus for control of memory charge restoration of a memory, comprising:
  means for determining a time position within a refresh window of a read operation of at least one memory cell of the memory;
  means for charging the at least one memory cell to a first voltage that is based on the time position of the read operation within the refresh window; and
  means for re-charging the at least one memory cell to a full voltage upon termination of the refresh window,
  wherein the first voltage is less than the full voltage in a first portion of the refresh window.

19. The apparatus of claim 18, wherein means for determining the time position of the read operation within the refresh window comprises means for determining that the read operation is received within one of at least three portions of the refresh window.

20. The apparatus of claim 18, further comprising:
  means for determining whether a change of a refresh rate of the at least one memory cell reduces voltage requirements for read operations based on a frequency of memory read operations; and
  means for changing the refresh rate in response to determining that increasing the refresh rate reduces voltage requirements for read operations.

* * * * *